United States Patent
Alles et al.

(10) Patent No.: US 8,400,358 B2
(45) Date of Patent: *Mar. 19, 2013

(54) METHOD TO MODIFY CALIBRATION DATA USED TO LOCATE A MOBILE UNIT

(75) Inventors: Martin Alles, Vienna, VA (US); John Carlson, Dulles, VA (US); George Maher, Herndon, VA (US); Selcuk Mazlum, Leesburg, VA (US)

(73) Assignee: Andrew LLC, Hickory, NC (US)

( * ) Notice: Subject to any disclaimer, the term of this patent is extended or adjusted under 35 U.S.C. 154(b) by 686 days.

This patent is subject to a terminal disclaimer.

(21) Appl. No.: 12/424,320

(22) Filed: Apr. 15, 2009

(65) Prior Publication Data

US 2009/0201207 A1 Aug. 13, 2009

Related U.S. Application Data

(63) Continuation of application No. 12/026,333, filed on Feb. 5, 2008, now Pat. No. 7,561,104.

(60) Provisional application No. 60/899,379, filed on Feb. 5, 2007.

(51) Int. Cl.
  *G01S 3/02* (2006.01)
(52) U.S. Cl. ........................................ 342/451; 342/457
(58) Field of Classification Search .................. 342/451, 342/457, 463–465; 455/456.1, 456.6, 457
  See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |
| 4,814,751 A | 3/1989 | Hawkins | |
| 4,845,504 A | 7/1989 | Roberts et al. | |
| 4,891,650 A | 1/1990 | Sheffer | |
| 5,056,106 A | 10/1991 | Wang | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |
| 5,372,144 A | 12/1994 | Mortier et al. | |
| 5,404,376 A | 4/1995 | Dent | |
| 5,423,067 A | 6/1995 | Manabe | |
| 5,465,289 A | 11/1995 | Kennedy | |

(Continued)

FOREIGN PATENT DOCUMENTS

| | | |
|---|---|---|
| EP | 1471688 A2 | 10/2004 |
| JP | 06-347529 | 12/1994 |

(Continued)

OTHER PUBLICATIONS

Y. Zhao, "Standardization of Mobile Phone Positioning for 3G Systems," IEEE Communications Magazine, Jul. 2002, D pp. 108-116.

(Continued)

*Primary Examiner* — Dao Phan
(74) *Attorney, Agent, or Firm* — Duane Morris LLP

(57) ABSTRACT

A method of modifying calibration data used to geo-locate a mobile station located in an indoor environment is disclosed. When a mobile station is located indoors, the signal strength of signals received and/or transmitted by the mobile station have the tendency to be lower than the strength of the signals received by a mobile station located outdoors. As a result of these lower signal strengths, geo-location efforts which rely on signal strengths may result in unsatisfactory location accuracy. Modifying pre-existing calibration data obtained outdoors may provide a way to simulate indoor calibration data characteristics.

52 Claims, 10 Drawing Sheets

U.S. PATENT DOCUMENTS

| | | | |
|---|---|---|---|
| 5,506,863 A | 4/1996 | Meidan et al. | |
| 5,506,864 A | 4/1996 | Schilling | |
| 5,508,708 A | 4/1996 | Ghosh et al. | |
| 5,512,908 A | 4/1996 | Herrick | |
| 5,515,419 A | 5/1996 | Sheffer | |
| 5,519,760 A | 5/1996 | Borkowski et al. | |
| 5,559,864 A | 9/1996 | Kennedy | |
| 5,592,180 A | 1/1997 | Yokev et al. | |
| 5,608,410 A | 3/1997 | Stilp et al. | |
| 5,614,914 A | 3/1997 | Bolgiano et al. | |
| 5,675,344 A | 10/1997 | Tong et al. | |
| 5,736,964 A | 4/1998 | Ghosh et al. | |
| 5,815,538 A | 9/1998 | Grell et al. | |
| 5,825,887 A | 10/1998 | Lennen | |
| 5,870,029 A | 2/1999 | Otto et al. | |
| 5,920,278 A | 7/1999 | Tyler et al. | |
| 5,952,969 A | 9/1999 | Hagerman et al. | |
| 5,959,580 A | 9/1999 | Maloney et al. | |
| 5,960,341 A | 9/1999 | LeBlanc et al. | |
| 5,973,643 A | 10/1999 | Hawkes et al. | |
| 5,987,329 A | 11/1999 | Yost | |
| 6,014,102 A | 1/2000 | Mitzlaff et al. | |
| 6,047,192 A | 4/2000 | Maloney | |
| 6,091,362 A | 7/2000 | Stilp | |
| 6,097,336 A | 8/2000 | Stilp | |
| 6,097,709 A | 8/2000 | Kuwabara | |
| 6,097,959 A | 8/2000 | Yost | |
| 6,101,178 A | 8/2000 | Beal | |
| 6,108,555 A | 8/2000 | Maloney et al. | |
| 6,108,558 A | 8/2000 | Vanderspool, II | |
| 6,115,599 A | 9/2000 | Stilp | |
| 6,115,605 A | 9/2000 | Siccardo et al. | |
| 6,119,013 A | 9/2000 | Maloney et al. | |
| 6,127,975 A | 10/2000 | Maloney | |
| 6,144,711 A | 11/2000 | Raleigh et al. | |
| 6,172,644 B1 | 1/2001 | Stilp | |
| 6,184,829 B1 | 2/2001 | Stilp | |
| 6,188,351 B1 | 2/2001 | Bloebaum | |
| 6,191,738 B1 | 2/2001 | Pfeil et al. | |
| 6,201,499 B1 | 3/2001 | Hawkes et al. | |
| 6,201,803 B1 | 3/2001 | Munday et al. | |
| 6,212,319 B1 | 4/2001 | Cayrefourcq | |
| 6,233,459 B1 | 5/2001 | Sullivan et al. | |
| 6,246,884 B1 | 6/2001 | Karmi et al. | |
| 6,266,013 B1 | 7/2001 | Stilp et al. | |
| 6,269,246 B1 | 7/2001 | Rao et al. | |
| 6,281,834 B1 | 8/2001 | Stilp | |
| 6,285,321 B1 | 9/2001 | Stilp et al. | |
| 6,288,675 B1 | 9/2001 | Maloney | |
| 6,288,676 B1 | 9/2001 | Maloney | |
| 6,295,455 B1 | 9/2001 | Fischer et al. | |
| 6,311,043 B1 | 10/2001 | Haardt et al. | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack | |
| 6,388,618 B1 | 5/2002 | Stilp et al. | |
| 6,393,294 B1 | 5/2002 | Perez-Breva et al. | |
| 6,400,320 B1 | 6/2002 | Stilp et al. | |
| 6,407,703 B1 | 6/2002 | Minter et al. | |
| 6,449,486 B1 | 9/2002 | Rao | |
| 6,463,290 B1 | 10/2002 | Stilp et al. | |
| 6,470,195 B1 | 10/2002 | Meyer | |
| 6,477,161 B1 | 11/2002 | Hudson | |
| 6,483,460 B2 | 11/2002 | Stilp et al. | |
| 6,492,944 B1 | 12/2002 | Stilp | |
| 6,501,955 B1 | 12/2002 | Durrant et al. | |
| 6,519,465 B2 | 2/2003 | Stilp et al. | |
| 6,546,256 B1 | 4/2003 | Maloney | |
| 6,553,322 B1 | 4/2003 | Ignagni | |
| 6,563,460 B2 | 5/2003 | Stilp et al. | |
| 6,571,082 B1 | 5/2003 | Rahman | |
| 6,591,112 B1 | 7/2003 | Siccardo et al. | |
| 6,603,428 B2 | 8/2003 | Stilp | |
| 6,603,761 B1 | 8/2003 | Wang | |
| 6,640,106 B2 | 10/2003 | Gutowski et al. | |
| 6,646,604 B2 | 11/2003 | Anderson | |
| 6,661,379 B2 | 12/2003 | Stilp et al. | |
| 6,765,531 B2 | 7/2004 | Anderson | |
| 6,771,625 B1 | 8/2004 | Beal | |
| 6,771,969 B1 | 8/2004 | Chinoy | |
| 6,782,264 B2 | 8/2004 | Anderson | |
| 6,782,265 B2 | 8/2004 | Perez-Breva et al. | |
| 6,834,234 B2 | 12/2004 | Scherzinger et al. | |
| 6,839,539 B2 | 1/2005 | Durrant et al. | |
| 6,845,240 B2 | 1/2005 | Carlson et al. | |
| 6,859,172 B2 | 2/2005 | Powers et al. | |
| 6,871,077 B2 | 3/2005 | Kennedy | |
| 6,873,290 B2 | 3/2005 | Anderson et al. | |
| 6,876,859 B2 | 4/2005 | Anderson et al. | |
| 6,920,329 B2 | 7/2005 | Kennedy, Jr. et al. | |
| 6,922,170 B2 | 7/2005 | Alexander, Jr. | |
| 6,944,465 B2 | 9/2005 | Spain et al. | |
| 6,952,158 B2 | 10/2005 | Kennedy, Jr. | |
| 6,987,979 B2 | 1/2006 | Carlsson | |
| 6,996,392 B2 | 2/2006 | Anderson | |
| 7,023,383 B2 | 4/2006 | Stilp et al. | |
| 7,116,987 B2 | 10/2006 | Spain, Jr. et al. | |
| 7,167,713 B2 | 1/2007 | Anderson | |
| 7,167,714 B2 | 1/2007 | Dressler et al. | |
| 7,233,799 B2 | 6/2007 | Spain, Jr. | |
| 7,250,907 B2 | 7/2007 | Krumm et al. | |
| 7,257,414 B2 | 8/2007 | Spain, Jr. et al. | |
| 7,271,765 B2 | 9/2007 | Stilp et al. | |
| 7,298,314 B2 | 11/2007 | Schantz et al. | |
| 7,340,259 B2 | 3/2008 | Maloney | |
| 7,383,051 B2 | 6/2008 | Spain, Jr. et al. | |
| 7,427,952 B2 | 9/2008 | Bull et al. | |
| 7,433,652 B2 | 10/2008 | Durgin | |
| 7,433,695 B2 | 10/2008 | Gordon et al. | |
| 7,440,762 B2 | 10/2008 | Maloney et al. | |
| 7,460,505 B2 | 12/2008 | Spain | |
| 7,561,104 B2 * | 7/2009 | Alles et al. | 342/451 |
| 7,593,738 B2 | 9/2009 | Anderson | |
| 7,725,111 B2 | 5/2010 | Dressler et al. | |
| 7,734,298 B2 | 6/2010 | Bhattacharya et al. | |
| 7,753,278 B2 | 7/2010 | Spain, Jr. et al. | |
| 7,796,966 B2 | 9/2010 | Bhattacharya et al. | |
| 7,848,762 B2 | 12/2010 | Gordon et al. | |
| 7,899,467 B2 | 3/2011 | Feuerstein et al. | |
| 8,013,785 B2 | 9/2011 | Bhattacharya et al. | |
| 8,068,802 B2 | 11/2011 | Bhattacharya et al. | |
| 8,068,855 B2 | 11/2011 | Dressler et al. | |
| 8,106,817 B2 | 1/2012 | Bhattacharya et al. | |
| 8,106,818 B2 | 1/2012 | Bhattacharya et al. | |
| 8,155,394 B2 | 4/2012 | Allegra et al. | |
| 2002/0172223 A1 | 11/2002 | Stilp | |
| 2003/0064734 A1 | 4/2003 | Stilp et al. | |
| 2003/0139188 A1 | 7/2003 | Chen et al. | |
| 2003/0190919 A1 | 10/2003 | Niemenmaa | |
| 2003/0203738 A1 | 10/2003 | Brown et al. | |
| 2004/0043775 A1 | 3/2004 | Kennedy, Jr. et al. | |
| 2004/0132466 A1 | 7/2004 | Kennedy, Jr. et al. | |
| 2004/0203539 A1 | 10/2004 | Benes et al. | |
| 2004/0203921 A1 | 10/2004 | Bromhead et al. | |
| 2004/0218664 A1 | 11/2004 | Kennedy, Jr. et al. | |
| 2004/0252752 A1 | 12/2004 | Kennedy, Jr. et al. | |
| 2005/0040968 A1 | 2/2005 | Damarla et al. | |
| 2005/0058182 A1 | 3/2005 | Kennedy, Jr. et al. | |
| 2005/0078033 A1 | 4/2005 | Tamaki et al. | |
| 2005/0093745 A1 | 5/2005 | Krumm et al. | |
| 2005/0136945 A1 | 6/2005 | Kennedy, Jr. et al. | |
| 2005/0164712 A1 | 7/2005 | Kennedy, Jr. et al. | |
| 2005/0176442 A1 | 8/2005 | Ju et al. | |
| 2005/0192026 A1 | 9/2005 | Carlson et al. | |
| 2005/0243936 A1 | 11/2005 | Agrawala et al. | |
| 2005/0266855 A1 | 12/2005 | Zeng et al. | |
| 2006/0003695 A1 | 1/2006 | Kennedy, Jr. et al. | |
| 2006/0003775 A1 | 1/2006 | Bull et al. | |
| 2006/0030333 A1 | 2/2006 | Ward et al. | |
| 2006/0116130 A1 | 6/2006 | Kennedy, Jr. et al. | |
| 2006/0125695 A1 | 6/2006 | Kennedy, Jr. et al. | |
| 2006/0141998 A1 | 6/2006 | Kennedy, Jr. et al. | |
| 2006/0154607 A1 | 7/2006 | Kennedy, Jr. et al. | |
| 2006/0240836 A1 | 10/2006 | Kennedy, Jr. et al. | |
| 2006/0240843 A1 | 10/2006 | Spain et al. | |

| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0161015 A1 | 4/2008 | Maloney et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

FOREIGN PATENT DOCUMENTS

| WO | 0034799 A1 | 6/2000 |
| WO | 02/082832 A2 | 10/2002 |
| WO | 2006/088472 | 8/2006 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in COMA Cellular Systems," IEEE Communications Magazine, Apr. 1998, pp. 38-45.

T. Rappaport, J.H. Reed and B.D. Woerner, Position Location Using Wireless Communications on Highways of the Future, IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, andV. Apte, "Capacity Analysis of the GSM Short Message Service", Indian Institute ofTechnology Bombay, www.cse.iitb.ac.inl-varsha/allpapers/wireless/ncc03cam.pdf, 2004, pp. 1-5.

J.D. Bard, and F.M. Ham, Time Difference of Arrival Dilution of Precision and Applications, IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9 •. Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C. B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M, Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of OF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D. I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in COMA Cellular Networks," IEEE Transactions on Vehicular Technology, vol. 47, No. 2, May 1998, pp. 406-416.

M.Silventoinen and T. Rantalainen, "Mobile Station Emergency Locating in GSM", Process IEEE International D Conference, Personal Wireless Communications, vol. 1, 1996, pp. 232-238.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

701

Providing a Database of Calibration Data

703

Collecting Observed Network Measurement Data

705

Modifying the Observed Network Measurement Data

707

Comparing the Modified Network Measurement Data to the Database of Calibration Data to Locate the Mobile

Providing a Database of Calibration Data

803

Collecting Observed Network Measured Date
Including a First Signal Characteristic

805

Modifying the Observed NM Data Using
the First Signal Characteristic

807

Comparing the Modified NM Data to the
Database of Calibration Data to
Locate the Mobile Station

Providing a Database of Calibration Data

903

Collecting Observed NM Data from a Plurality Transmitter Including a Signal Characteristic

905

Determining an Average Value for a Signal Characteristic

907

Modifying the Observed NM Data Using the Average Value of the Signal Characteristic

909

Comparing the Modified NM Data to the Database of Calibration Data to Determine the Location of the Mobile

Providing a Database of Calibration

1003

Collecting Network Measurement Data

1005

Comparing Network Measured Data with the Calibration Data to Determine a Plurality of Location Estimates

1007

Determining a Confidence Measure

1009

Determining a Location Based on the Plurality of Location Estimates and the Respective Confidence Measures

Figure 10

METHOD TO MODIFY CALIBRATION DATA USED TO LOCATE A MOBILE UNIT

CROSS REFERENCES

The present application is a continuation application of and claims the priority benefit of U.S. application Ser. No. 12/026,333 filed Feb. 5, 2008, now U.S. Pat. No. 7,561,104 entitled "Method to Modify Calibration data Used to Locate a Mobile Unit," which is related to and claims the priority benefit of Provisional Application No. 60/899,379 entitled "Mobile Location Using Network Measurement Reports" filed on Feb. 5, 2007, each of which are hereby incorporated by reference in their entirety.

BACKGROUND

The use of wireless communication devices such as telephones, pagers, personal digital assistants, laptop computers, etc., hereinafter referred to collectively as "mobile appliances" or "mobiles stations" has become prevalent in today's society. In recent years, at the urging of public safety groups, there has been increased interest in technology which can determine the geographic position or "geo-locate" a mobile station in certain circumstances.

Estimating the location or "geo-locating" a mobile station may require one or more types of calibration data associated with the mobile station (e.g., signal strength, round trip time, time difference of arrival (TDOA), etc.). Calibration data is typically collected in an outdoor environment. The primary reason for collecting calibration data outdoors is the greater ease of performing automated calibration collection procedures or, in some instances, manual collection procedures along roads. It is more time-consuming to perform calibration procedures indoors due to the required access to buildings and the inability to utilize automated collection procedures designed for outdoor environments.

When a wireless device is located indoors, the signal strengths of signals received from the serving and/or neighboring base stations tend to be lower than the strength of the signals received by a wireless device located outdoors. As a result of these lower signal strengths, performing comparisons between the received signal strengths of the indoor wireless device and signal strength data stored in a calibration database may result in a poor estimated location accuracy. Modifying the calibration data obtained outdoors may provide a way to simulate indoor calibration data characteristics. Calibration data collected in areas located adjacent to indoor facilities may be altered to increase the accuracy of location estimates of a mobile station located indoors.

One embodiment of the present subject matter is a method for determining a location of a mobile station. The method includes providing a database of previously-gathered calibration data for a predetermined region in a wireless network and collecting observed network measurement data. The method also includes modifying the observed network measurements and then comparing the modified data with the database of calibration data to determine the location of the mobile station.

Another embodiment of the present subject matter is a system for determining a location of a mobile station. The system includes a database of previously-gathered calibration data for a region in a wireless network and circuitry such as a wireless receiver for collecting observed network measurement data. The system includes circuitry, such as a processor, for modifying the observed network measurement data; and circuitry, such as a processor, for comparing the modified data with the calibration data in the database to determine the location of the mobile station.

Yet another embodiment of the present subject matter is a method for determining a location of a mobile station. The method includes providing a database of previously-gathered calibration data for a region in a wireless network which includes a serving transmitter. The method collects observed network measurement data including a first network characteristic from said serving transmitter and modifies the observed network measurement data using said first characteristic. The method compares the modified network measurement data with the database of calibration data to thereby determine the location of the mobile station.

Still yet another embodiment of the present subject matter is a method for determining a location of a mobile station. The method includes providing a database of previously-gathered calibration data for a region in a wireless network including a first transmitter and a second transmitter. The method also includes collecting observed network measurement data including a first and second signal characteristic from the first and second transmitters respectively and determining which of the first and second signal characteristics has a greater magnitude. The observed network measurement data may be modified using the greater magnitude signal characteristic, and the modified network measurement data may be compared with the database of calibration data to determine the location of the mobile station.

A further embodiment of the present subject matter is a method for determining a location of a mobile station. The method includes providing a database of previously-gathered calibration data for a region in a wireless network and collecting observed network measurement data from a plurality of transmitters which includes a signal characteristic from each one of said plural transmitters. The method also includes determining an average value for the signal characteristics and modifying the observed network measurement data using the average value. The method may then compare the modified network measurement data with the database of calibration data to determine the location of the mobile station.

Still a further embodiment of the present subject matter recognizes that it may be desirable to locate a mobile station by obtaining at least one network measurement report representing at least one first signal characteristic of the mobile station's serving base station, and at least one second and third signal characteristics of neighboring base stations. The method may also compute the difference between the at least one first signal characteristic of the mobile station's serving base station and the at least one second signal characteristic of at least one of the neighboring base stations to determine a first solution and determine which neighboring base station has the highest signal power level at a particular location. The difference between the highest signal power and the power levels of the serving base station and the remaining neighboring base stations may be computed to determine a second solution. It may also be determined which neighboring base station has the lowest signal power level at the particular location. The method may also comprise computing an average signal power level intermediary to the difference between the highest signal power level and the lowest signal power level to determine a third solution and determining which of the three solutions is a most optimal solution based on at least one comparison of the three solutions. At least one signal characteristic of the network measurement report may be adjusted based on the most optimal solution and the modified network measurement report may be utilized to locate a mobile station.

Another embodiment of the present subject matter is a method for determining a location of a mobile station. The method includes providing a database of previously-gathered outdoor calibration data for a region in a wireless network, collecting network measurement data, and comparing the network measurement data with the database of calibration data to thereby determine several location estimates of the mobile station. The method may also include determining a confidence measure for each of the plurality of location estimates and determining the location of the mobile station based on the plurality of location estimates and their respective confidence measures.

These and other advantages of the disclosed subject matter over the prior art will be readily apparent to one skilled in the art to which the disclosure pertains from a perusal of the claims, the appended drawings, and the following detailed description of the preferred embodiments.

BRIEF DESCRIPTION OF THE DRAWINGS

FIG. 7 illustrates a flow diagram of an embodiment of the subject matter.

FIG. 8 illustrates a flow diagram of another embodiment of the subject matter.

FIG. 9 illustrates a flow diagram of another embodiment of the subject matter.

FIG. 10 illustrates a flow diagram of another embodiment of the subject matter.

DETAILED DESCRIPTION

Calibration data samples obtained outdoors may be used to simulate indoor calibration data to locate a mobile station (MS) in an indoor facility. A method of utilizing calibration data samples to represent indoor and/or outdoor wireless networking environments is described herein.

Reliably locating a mobile station located indoors, even when the calibration data has been obtained in an outdoor environment, may simplify a calibration collection procedure. Calibration data obtained outdoors may be modified and substituted for indoor calibration data. In addition network measurement data may be modified for comparison with the outdoor calibration data.

Figure 1:
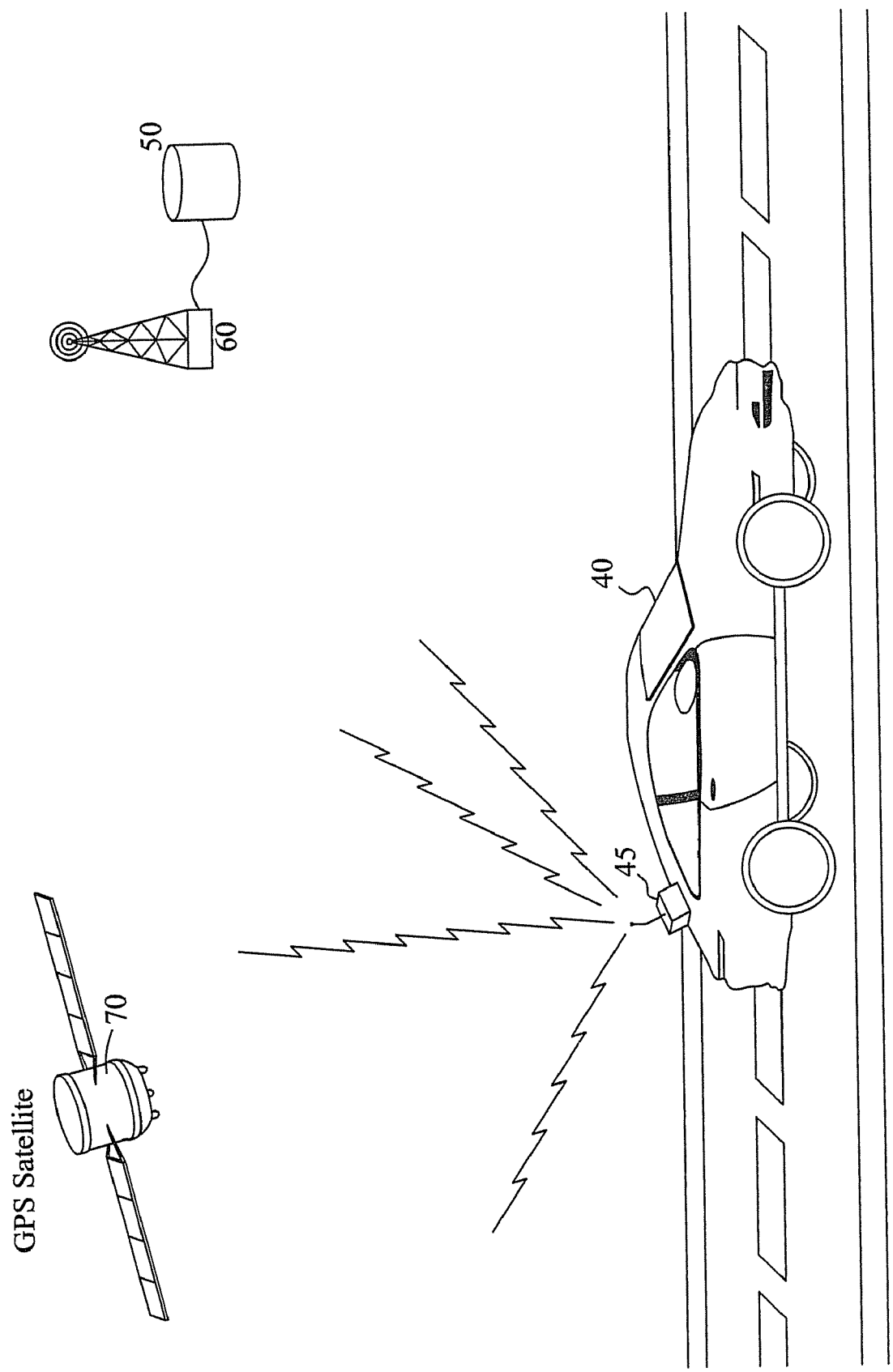
FIG. 1 illustrates a wireless communications networking environment.

In general, a non-uniform grid point (NUG) may represent the signal characteristics and/or calibration data over a given region. As illustrated in FIG. 1, a set of NUGs (NUG1, NUG2 and NUG3) are shown as being a part of a larger geographical region (R), which includes various wireless networking components (e.g., (MS 11 and BS 20—NUG1), (MSs 12-15—NUG2) and (MSs 16-18 and BS 30—NUG3)). The NUGs represent an area of collected calibration data, which may be stored in a database for easy retrieval during a calibration data comparison operation between the NUG and a received network measurement report (NMR).

Calibration data may be obtained from data collection devices during field test operations, and/or from MSs or other communication devices within the general area of the NUG. Cross-NUG communications may occur between MSs and/or BSs located within communication range of one or more of the NUGs. For example, BS 10 may be located outside the region (R) and may communicate with one or more devices located in the various NUGs 1-3. The different NUGs 1-3 may be separately defined by a variety of parameters. For example, geographical areas (e.g., mountains, buildings, roads) may be a factor in deciding the boundaries of a NUG. Additionally, varying concentrations of MSs may be another factor that separates one NUG from another.

Network measurement reports (NMRs) may be used to represent network characteristics at particular locations within a given region (R). Any point located within a NUG may have corresponding signal strength levels that represent the signal power of the serving and/or neighboring cell (NC) BSs. An exemplary NMR may be represented by example_data_vector=[P1, P2, P3, TA1]. Referring to FIG. 1, the power level signals (P1-P3) may represent the power levels of the three BSs 10, 20 and 30, as measured at a particular location. The timing advance parameter TA1 (or equivalent parameter) may be used to represent timing information of signals transmitted between the MS and one or more BSs.

The value of the timing advance (TA) parameter corresponds to the length of time a signal from a MS takes to reach a particular BS. A MS may be configured to transmit data signals at specific timeslot intervals depending on the type of wireless communication protocol employed (e.g., TDMA, GSM, 3GPP etc.). Using the speed of light ($c=3*10^8$ m/s) as a reference velocity for the radio waves, the TA parameter may be increased or decreased depending on the distance between the MS and the BS. The TA parameter may be periodically adjusted as the distance from the MS to the BS changes. Of course, a NMR may contain any number and type of parameters, and may be used to estimate the location of a MS.

For example, NMR(s) may be transmitted from the MS or from other wireless communication components to position determining equipment (PDE) 50, which processes the received NMR information and may attempt to locate the position of the MS. NMR(s) may be periodically generated by MSs or other communication devices to calibrate the NUG. The NUG may also be based entirely on information received from NMR(s) generated by MSs located in the NUG.

The received Network Measurement data (NM data) may be compared to predetermined calibration data representing one or more NUGs to estimate the location of a MS. In a case where NM data is compared against a NUG, like parameters may be compared to estimate if the target MS 18 is within the NUG. Similarly, NUG parameters may be computed in response to a comparison operation, and then compared to the NM data. Each NUG may have a series of parameters and/or functions characterizing one or more particular locations in the NUG. Given a received set of one or more NMR(s) obtained from some unknown location, an estimate of that unknown location may be calculated using the characterization of the NUG or uniform grid (UG) over that region.

It may be desirable to use the original unmodified NM data directly without modification when locating a mobile station. Assuming the MS is located in an indoor facility, the data contained in the NMR(s) may be a function of calibration data collected outdoors. In some cases, the unmodified outdoor calibration data used to represent the indoor facility may provide an accurate representation of the location of the target MS 18 (e.g., low distortion structures, open-faced facilities, etc.).

Referring to FIG. 1, the NM data may be sent from the target MS 18 to the BS 10, where the PDE 50 processes the NMR and performs one or more comparison operations between the NM data and the calibration data of the NUG(s). Once the comparison operation is complete, the location of the target MS 18 may be estimated. A direct comparison of the original NM data may be made against the corresponding NUG(s) characteristics. Alternatively, the NM data may not be modified even if NUG(s) are utilized to estimate the location of the mobile station.

NM data may also be modified to adjust the power levels received from the serving and/or neighboring cell (NC) base stations. For example, differences in parameters between the serving cell and the NC may be calculated and the quantities used to modify the original NM data.

If an original NMR received at the PDE 50 had the form NMR1=[P1, P2, P3, TA1], where P1 is the serving BS power at a particular location, P2 is a first NC power, P3 is a second NC power, and TA1 is the timing advance parameter, the modified NMR may be represented by: NMR_modified=[0, P1-P2, P1-P3, TA1]. The resulting data vector may be used to calculate new relative power levels of the NC BSs by subtracting or adding the NMR_modified parameters from the original NMR1 parameters. In this example, the power of the serving BS may be used as a basis to obtain relative power level modification parameters to modify the NC power level parameters of NMR(s).

The calculated modified parameters (NMR_modified=[0, P1-P2, P1-P3, TA1]) may also be used to simulate an indoor facility by modifying NMR(s) received from an indoor location. Alternatively, the modified parameters may be used to conduct other calculations to obtain a desired set of modified results. For example, the modified NMR may be compared to one or more of the NUG(s) to provide an estimated location of a MS. Of course, the serving BS power level is not a required parameter to be used as a basis to obtain relative power level modification parameters, and many other parameters may be used to modify the NM data to simulate an indoor facility.

To further illustrate modification of the NMR, consider a particular implementation where the variable RxLevServing_WD represents the received signal strength of the serving base station's control channel measured by the wireless device at an unknown location. Let RxLevNeigh_i_WD represent the received signal strength of the $i^{th}$ neighbor's control channel, RxLevServing_DB represent the average received signal strength of the serving station's control channel, stored in a database of the PDE 50 during the calibration process, and RxLevNeigh_i_DB represent the average received signal strength of the $i^{th}$ neighbor's control channel stored in the database during a calibration process (i=1 to N, where N is the number of neighbor cells reported).

A comparison operation may be conducted between the received signal strengths of the NC-BSs relative to the serving BS's received signal strength. For example, a comparison may include computing the difference between the parameters of the serving base station and the $i^{th}$ neighbor's parameters (i.e., (RxLevServing_WD-RxLevNeigh_i_WD) and (RxLevServing_DB-RxLevNeigh_i_DB)). Once the differences are calculated, the magnitudes of the differences may be compared to a predetermined threshold value used to distinguish between an acceptable difference value requiring no modification to the NM data and a non-acceptable difference value invoking further modification efforts.

NM data may be modified by an amount relative to the signal strength of a NC-BS. In this example, the NC-BS having the highest signal power may be used as a basis to modify the values of the NM data. The differences between the NC having the highest cell power and the cell powers of the remaining NC-BSs may be calculated and the quantities thereof used to modify the original NM data.

An exemplary NMR may have the form NMR=[P1, P2, P3, P4, TA1], where P1 is the serving BS signal power, P2 is a NC having the highest signal power at the intended location of the NMR, P3 and P4 are different NC signal powers, and TA1 is a timing advance parameter. In this example, P2 has the highest signal power level and may be used as the basis for modifying the parameters of the NMR. The modified NMR may then be represented by NMR_modified2=[P2-P1, 0, P2-P3, P2-P4, TA 1]. The resulting data vector NMR_modified2 may be used to calculate new power levels of the NC base stations by subtracting or adding the NMR_modified2 parameters to the original NMR parameters.

The modified NMR may be compared to one or more of the NUG(s). In the previous examples, the power of the serving BS and the NC with the highest signal power level were used to obtain the relative power modification quantities. The signal power level of the serving BS and/or the NC having the highest signal power may be used solely to modify the NMR, and may not be included in comparison operations against the NUG(s). If the serving BS power level parameter and/or the NC having the highest signal power level parameter are excluded from the comparison to the NUG(s), the first and/or additional terms of the NMR may be ignored during the comparison operation. Of course, any other parameter may be utilized and the example above including power level should not limit the scope of the claims appended herewith.

To further illustrate modification of the NMR, consider a particular implementation where the variable RxLevNeigh_h_WD represents the received signal strength of a neighboring BS's control channel (neighbor A) having the highest signal level, as measured by the wireless device. RxLevNeigh_h_WD may be listed first in a measurement report list containing signal strengths sorted in descending order (h=1). Let RxLevNeigh_i_WD represent the received signal strength of the $i^{th}$ neighbor's control channel measured (neighbor i, where i≠h), as by the wireless device, and RxLevNeigh_h_DB represent the received signal strength of the neighbor (neighbor A) with the highest received signal strength, as measured by the wireless device, and which may be stored in the PDE 50 database during a calibration process. RxLevNeigh_i_DB may be used to represent the received signal strength of the $i^{th}$ neighboring BS's control channel (neighbor i, where i≠h, and i=1 to N, and where N is the number of neighbors reported). RxLevNeigh_i_DB may be stored in the PDE 50 database during a calibration process.

In this example, correlation may be conducted over the received signal strengths of the NC-BSs relative to the NC-BS having the highest received signal strength, as observed by the wireless device. A comparison may include computing the difference between the parameters of the serving BS and the $i^{th}$ neighbor's parameters (i.e. (RxLevNeigh_h_WD-RxLevNeigh_i_WD) and (RxLevNeigh_h_DB-RxLevNeigh_i_DB)). Comparisons may also be conducted for any one, combination of or all of the measured parameters of the NC-BSs.

NM data may be modified to adjust the power levels received from the serving and/or neighboring cell (NC) base stations by an amount relative to the average signal strength of one or more NC base stations. Each signal power or parameter component of the NMR may also be modified by an average signal power or parameter level based on one or more of the measured NC signal power levels. The average received signal power level may be calculated a number of different ways, for example, the average of the two highest signal powers, the three highest powers, the average of all (N) signal powers, or an intermediary number between one or more of the measured NC signal power components. Modifying the original NMR components may include subtracting or adding to the existing NMR power components by an amount based on the calculated average, or other various known functions.

To further illustrate modification of the NMR, consider a particular implementation where RxLevNeigh_avg_WD represents the average received signal strength based upon a number of control channel signal powers of neighboring BSs, as measured by the wireless device at an unknown location to be estimated. Let RxLevNeigh_i_WD represent the received signal strength of the $i^{th}$ neighbor's control channel signal power, and RxLevNeigh_avg_DB represent the average received signal strength of data stored during calibration, and computed based on the neighboring BSs, as measured by the wireless device and used in computing the average received signal strength. The same neighboring BSs may be used to represent the average received signal strength of the signal power levels received by the wireless device and for the average received signal strength of calibration data stored in the PDE 50 database. Let RxLevNeigh_i_DB represent the received signal strength of the $i^{th}$ neighbor's control channel stored in the PDE 50 database during the calibration process (i=1 to N, where N is the number of neighbors reported).

In this example, a comparison may be conducted over the received signal strengths of the neighboring BSs relative to the average received signal strength computed for all neighboring BSs observed by the wireless device (i.e., compare between (RxLevNeigh_avg_WD-RxLevNeigh_i_WD)) and for all neighbors previously measured by the wireless device (i.e., compare between (RxLevNeigh_avg_DB-RxLevNeigh_i_DB)). The average signal power level observed over all the neighbor signal power levels may be realized in absolute powers (mW) or in relative powers (dBm).

Any combination of the above NMR modification procedures may be performed to increase the accuracy of mobile station location estimates. Further, any number of or type of parameters may be utilized in any of the aforementioned procedures and the exemplary parameters of power level, signal strength, etc. should not limit the scope of the claims appended wherewith. Certain factors impacting the modification procedure selection process may include the specific type of cellular technology, the geographical terrain and/or environmental conditions, etc. Further, the present subject matter acknowledges that some NMR modification procedures may be best suited for outdoor location estimation, while others are better suited for indoor location estimation, and some even may be best for mixed (indoor & outdoor) location estimation.

For example, if the serving BS for a mobile station is known to be in an area where there are no buildings or obstructions then it may be prudent to leave the NM data unmodified or select the NMR modification procedure where the serving base station is used as the basis to calculate NMR modifications. Further, if the serving cell is in a geographical area with known large obstructions (e.g., buildings, mountains etc.) then it may be prudent to use the NMR modification procedure that selects the NC base station having the highest signal power as the basis to calculate NMR modifications. Additionally, if the serving cell is in an area containing both outdoor and indoor facilities, then it may be best to use the average of more than one NC signal power value as the basis to modify the NMR(s).

Regardless of the type of modification algorithm selected to modify the NM data, a margin of error may still be present when attempting to determine the precise location of a mobile station. Determining the amount of location error may be useful when estimating the likelihood of accurately locating a mobile station. A confidence measure may also be used to represent the accuracy of a mobile station's estimated location.

The value of a confidence measure may vary depending on the estimated accuracy of the location estimated. If estimated locations derived from mapping NM data to a given location, whether using a NUG or other form of a data source for comparison purposes, agree under any or all combinations, the respective confidence measure "C" may be considered high. A confidence measure may also be represented as a function that increases as the quantity of measured data correctly matches data associated with a final estimated location. An exemplary confidence measure or function may be represented as a fraction of all locations that are similar to the final estimated location, however, such an example should not limit the scope of the claims appended herewith.

After one or more of the data modification procedures have been calculated, respective confidence measures may be calculated to represent the likely accuracy of the modification procedures. Confidence measures may then be compared and the best one selected to represent the appropriate modification procedure to implement.

Certain estimated locations may be assigned weights by using a confidence measure as a weight to represent the probability of locating a mobile station at a given location. For example, confidence measures may be based on one or more calculated parameters, including, but not limited to: a probability density function (PDF), a joint PDF, Mahalanobis distance, distortion measure, ordered number parameter, timing advance (TA) parameter, mobile orientation etc. The calculated parameters may be derived from the NUG calibration data stored in the PDE 50 database. The parameters may be pre-stored in memory or may be calculated during a NMR to NUG comparison operation.

Probability density functions may be calculated based on an individual NC base station power level, or a set of multiple NC base station power levels. The calculated probability density function may be compared to the set of available NUGs (i.e., NUGS 1-3 of FIG. 1) to determine a probability that the NM data matches a particular NUG location. A joint probability may also be calculated over a set of probabilities to further estimate the location of the mobile station. The results of the calculated PDF may be used in a number of estimation techniques to locate the mobile station.

Distortion measures may be determined at a particular location may be included in a NMR and used in a comparison operation to measure the difference in distortion between NUG data and NM data. The distortion measures may be used to estimate a location of a mobile station based on the results of the comparison.

A Mahalanobis distance may be an exemplary distortion measure and may utilized to assist in identifying and analyzing different patterns in a wireless communications environment. The Mahalanobis distance may also be useful in determining similarities between an unknown sample data set and a known data set.

Ordering number lists may also be used to organize parameters for comparison purposes. An ordering number list may be a list or table of data parameters organized in a particular order. The power levels may be listed in descending order and compared to similar parameters associated with a NUG(s). A threshold power level may be used to represent an acceptable amount of deviation between a comparison of power levels obtained from a NMR(s) and/or a NUG(s). If one or more power levels in the NMR(s) and the NUG(s) fall within an acceptable range of one another, the location of a mobile station may be measured with a corresponding degree of accuracy.

Each generated NMR may be used to provide an individual estimate of the mobile station's location. The PDE 50 may receive a number of NMRs over a period of time, a corresponding number of location estimates may be generated based on the number of NMRs received. These estimates may be combined in a statistical algorithm and may provide a more accurate location estimate than the individual NMRs.

Given a particular NMR or set of NMR(s) containing data collected outdoors, a selection procedure may be conducted to select the most appropriate modification procedure to use when modifying the NM data. Once one or more of the above described NMR modification procedures have been calculated, (e.g., non-modification, serving cell power level, highest NC power level, average(s) of the NC power levels, etc.) one or more of these calculations may be selected as an optimal solution to be used to modify the NMR.

One way to determine the optimal solution that should be used to modify the NMR is to calculate a confidence measure for each of the calculated modification procedures. Once the confidence measures have been calculated, the optimal solution may be selected as the modification procedure with the highest confidence measure. Alternatively, a location estimate may be made by weighting the individual solutions by the applicable confidence measure and combining the results into a single NMR solution.

Combining multiple NMR(s) may generate a location estimate with increased accuracy. When comparing NM data to a NUG, the grid point data that most closely matches the NM data may become the estimated location of the mobile station. In an alternative arrangement, interpolation may be used for determining a location that falls between two grid points to provide an even more accurate location estimate. Applying probabilistic weights, hypotheses and deriving confidence measures may increase the accuracy of the location estimates. Utilizing exemplary probabilistic measures, the estimated location of a mobile station may be determined within a particular degree of certainty. A similar approach may also be applied to select the appropriate NMR modification procedure to accommodate for varying conditions and other operational variables (e.g., different air standards, varying environmental circumstances, etc.).

Figure 2:
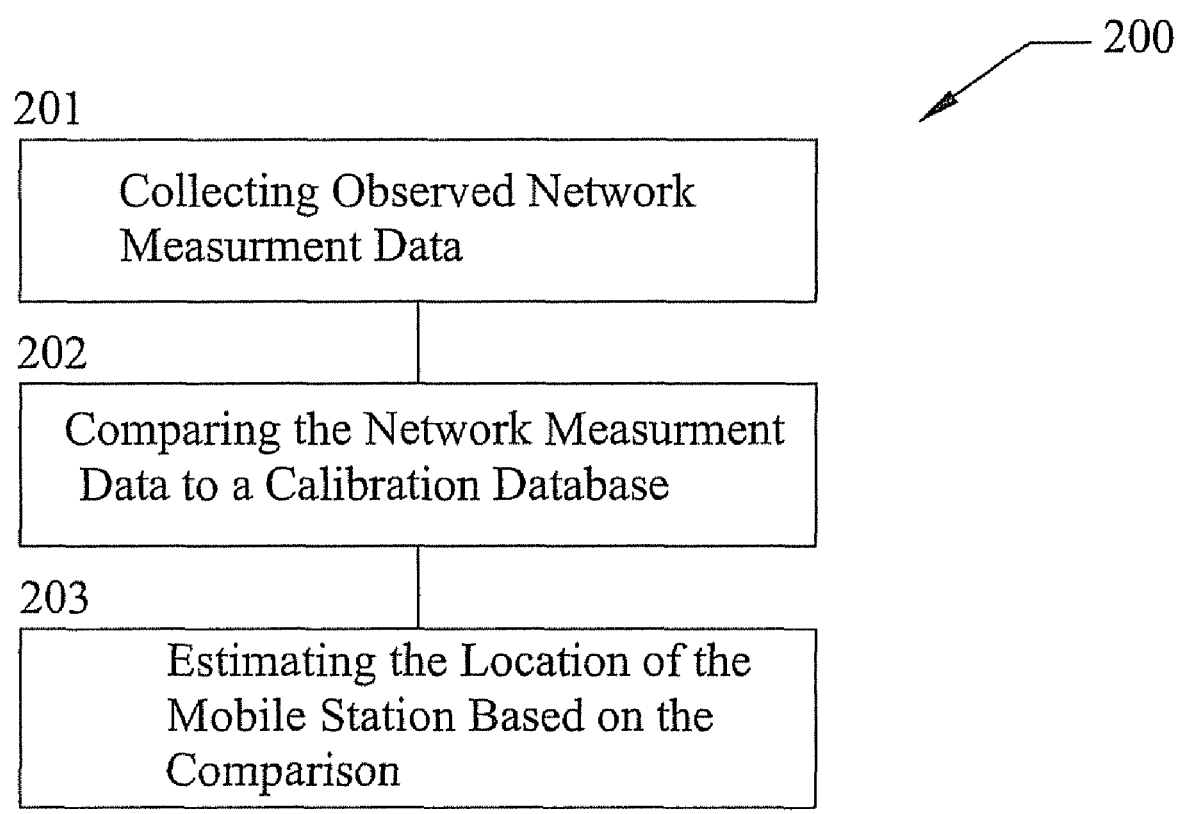
FIG. 2 illustrates a flow diagram of an exemplary inventive concept.

FIG. 2 illustrates a flow diagram 200 of a method to locate a mobile station. Observed network measurement data may be collected (operation 201). The observed data would typically be the same or similar to the data in a network measurement report (NMR). The network measurement data represents at least one network characteristic observed by the mobile station operating at a particular location within a region. The NM data may be compared to calibration database data, where the calibration database data represents calibration data measured within the geographical area of the region (operation 202). The location of the mobile station may be estimated based on the comparison of the modified network measurement data and the calibration database data (operation 203).

Figure 3:
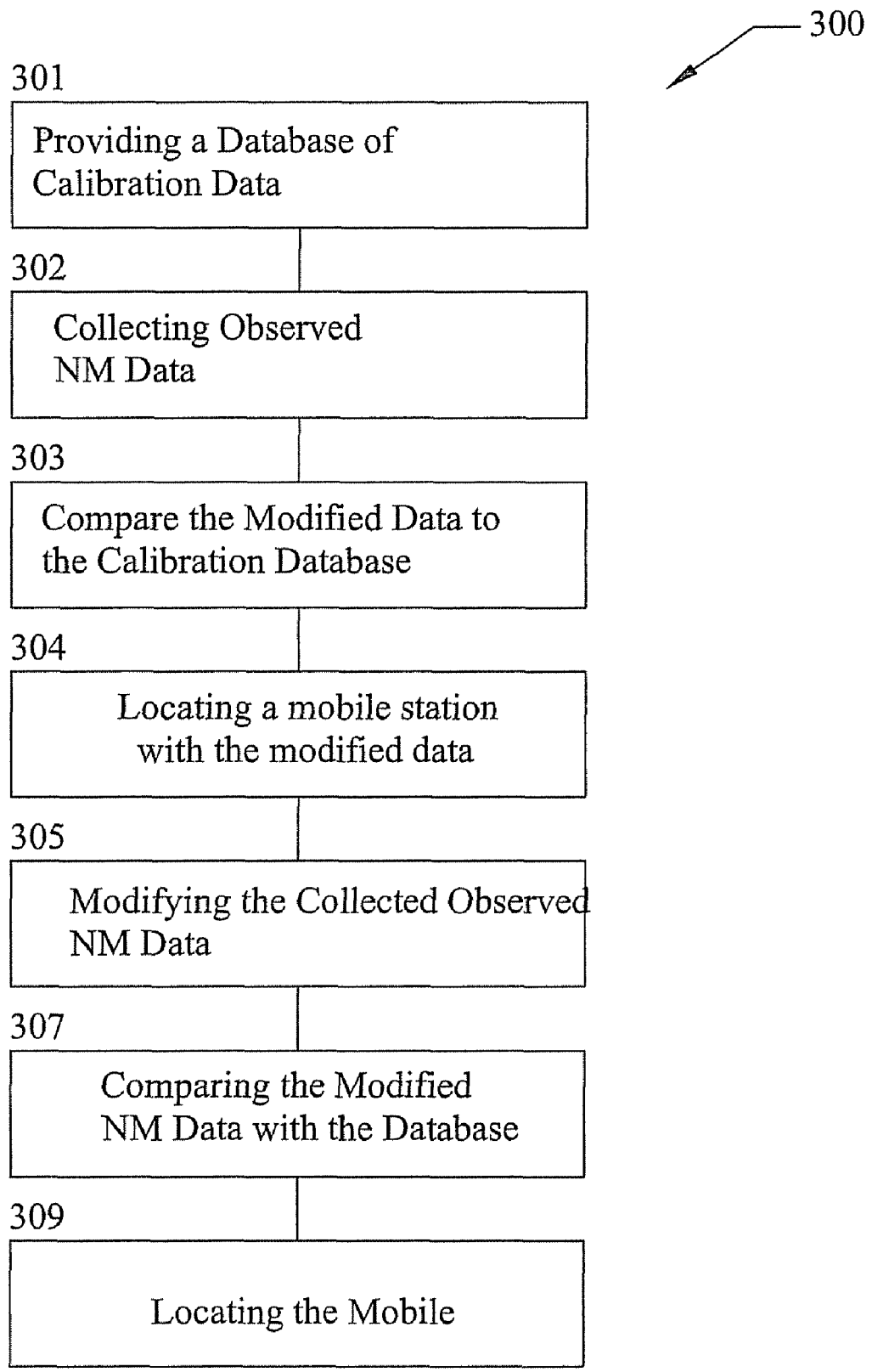
FIG. 3 illustrates a flow diagram of another exemplary inventive concept.

FIG. 3 illustrates a flow diagram 300 of a method to locate a mobile station in an indoor environment. Calibration data samples are collected in an outdoor environment (operation 301). At least one attenuation variable may be applied to the calibration data sample to simulate an indoor environment (operation 302). The modified network measurement data sample may be applied to a mobile station location algorithm (operation 303). The mobile station may be then located in the indoor environment based on the mobile station location algorithm implementing the at least one modified calibration sample (operation 304).

Figure 4:
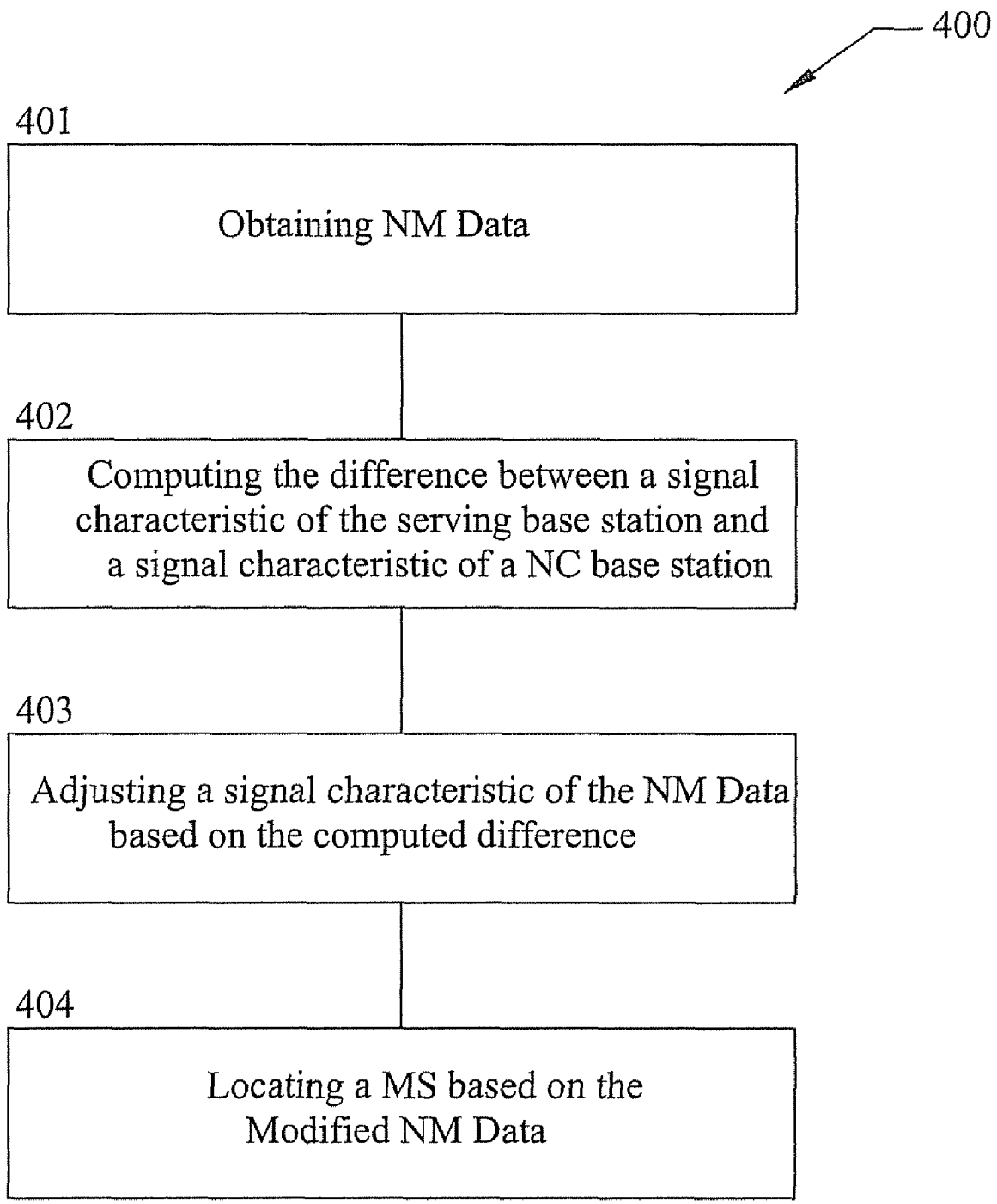
FIG. 4 illustrates a flow diagram of yet another exemplary inventive concept.

FIG. 4 illustrates a flow diagram 400 of a method to locate a mobile station. NM data may be obtained to represent at least one network characteristic of the mobile station's serving base station and at least one second network characteristic of at least one of the mobile station's neighboring base stations (operation 401). The difference between the at least one first signal characteristic and the at least one second signal characteristic may be computed (operation 402). At least one signal characteristic of the NM data may be adjusted based on the computed difference (operation 403). The mobile station may be then located based on the modified network measurement data (operation 404).

Figure 5:
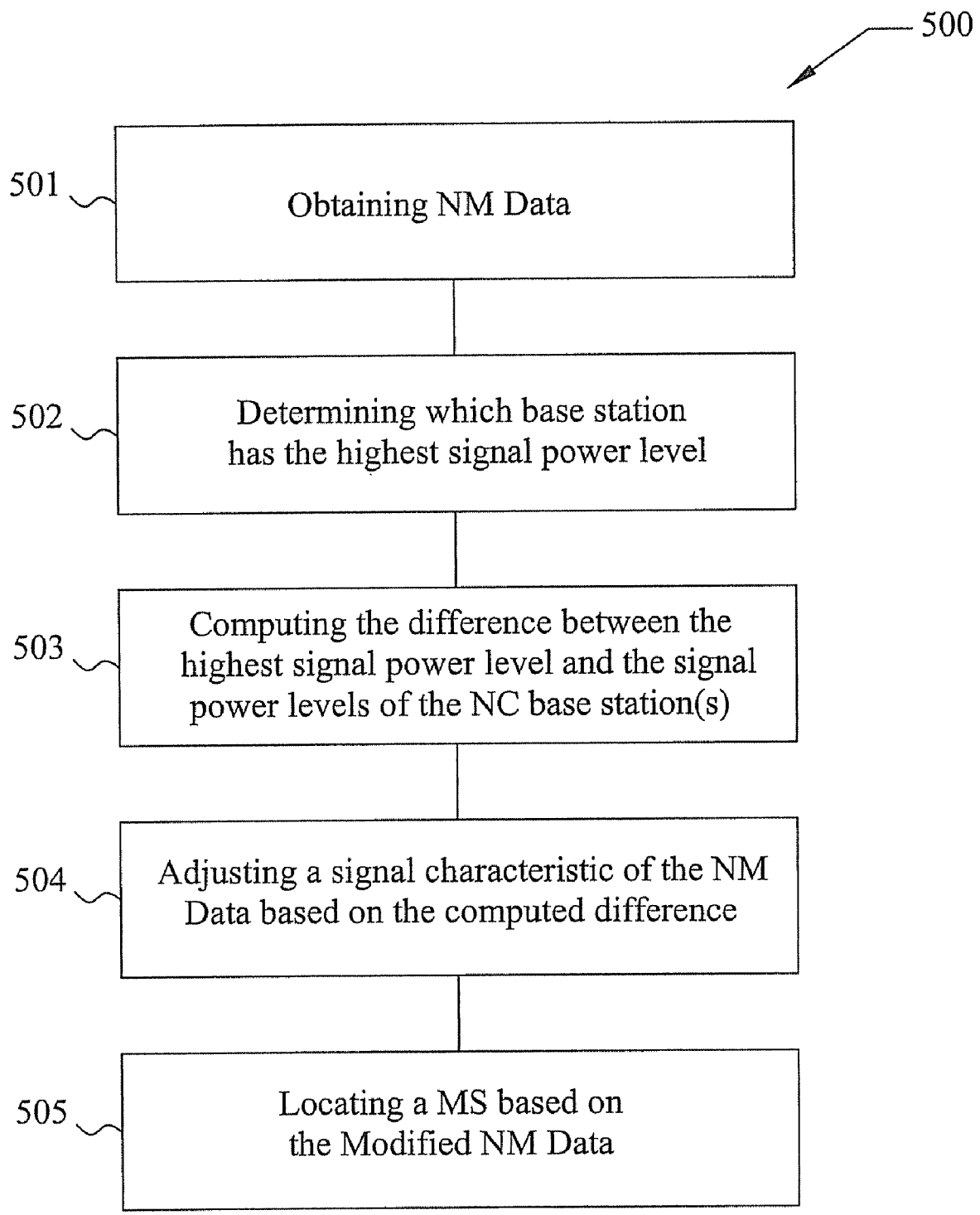
FIG. 5 illustrates a flow diagram of still another exemplary inventive concept.

FIG. 5 illustrates a flow diagram 500 of a method to locate a mobile station. NM data may be obtained (operation 501), which represents at least one first network characteristic of the mobile station's serving base station, and at least one second and third network characteristic of the mobile station's at least two neighboring base stations. It may be then determined which base station has the highest signal power at a particular location (operation 502). The difference between the highest signal power at the particular location and the power levels at the particular location of the serving base station and the remaining neighboring base stations may be determined (operation 503). At least one signal characteristic of the NM data may be adjusted based on the computed differences (operation 504). The mobile station may then be located based on the modified NMR (operation 505).

Figure 6:
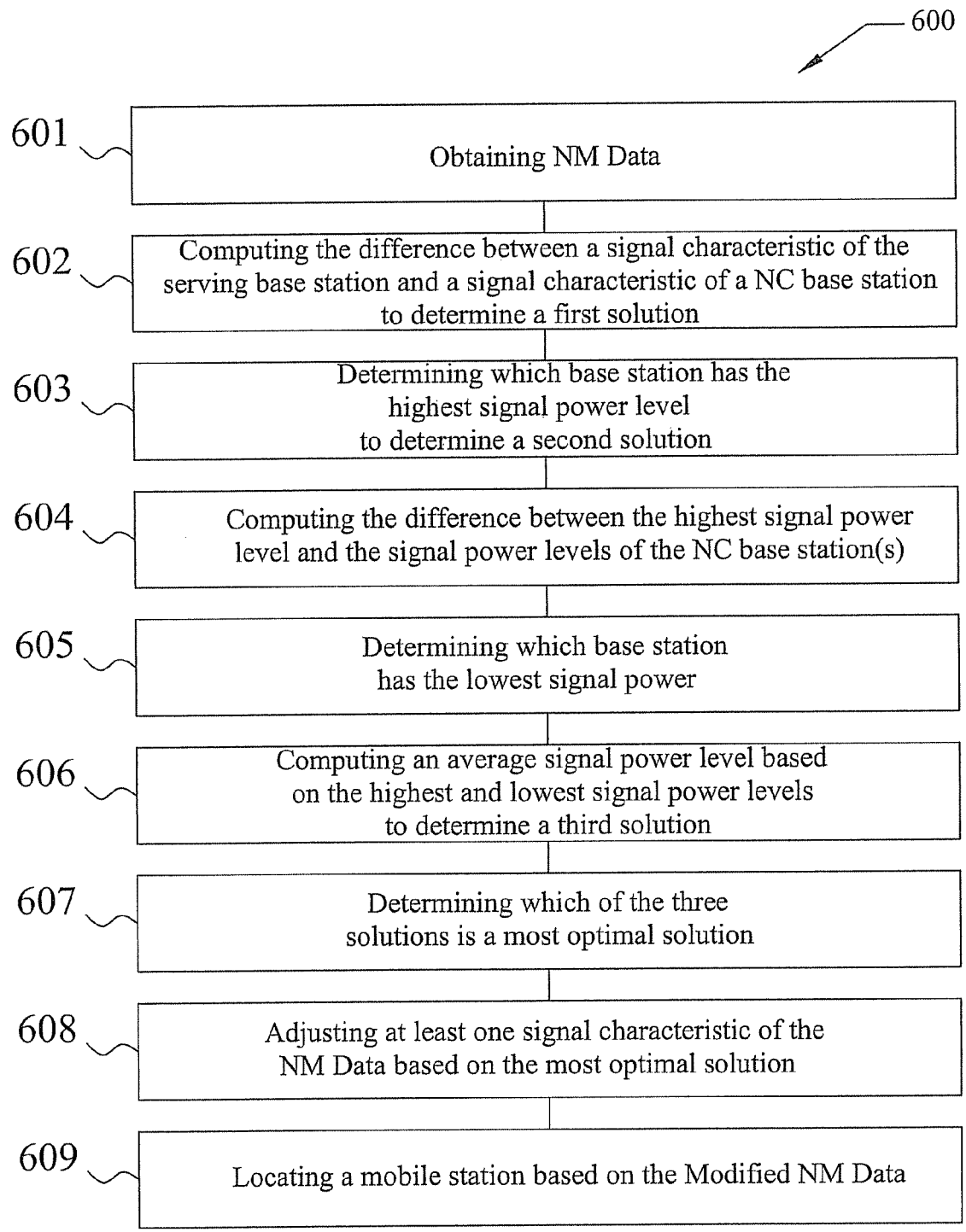
FIG. 6 illustrates a flow diagram of still yet another exemplary inventive concept.

FIG. 6 illustrates a flow diagram 600 of a method to locate a mobile station. A NMR may be obtained (operation 601), which represents at least one first signal characteristic of the mobile station's serving base station, and at least one second and third signal characteristics of the mobile station's at least two respective neighboring base stations. A difference may be computed between the at least one first signal characteristic of the mobile station's serving base station and the at least one second signal characteristic of at least one of the mobile station's neighboring base stations to determine a first solution (operation 602). It may then be determined which base station has the highest signal power level at a particular location (operation 603). The difference between the highest signal power and the power levels of the serving base station and the remaining neighboring base stations may be determined as a second solution (operation 604). The neighboring base station having the lowest signal power level at the particular location may be determined (operation 605). An average signal power level intermediary to the difference between the highest signal power level and the lowest signal power level may be determined as a third solution (operation 606). It may then be determined which solution is a most optimal solution by comparing the three solutions (operation 607). The signal characteristic of the NM data may then be adjusted based on the most optimal solution (operation 608). The mobile station may then be located based on the adjusted NM data (operation 609).

FIG. 7 illustrates an embodiment of the present subject matter. The method includes providing a database of previously-gathered calibration data for a predetermined region in a wireless network (operation 701). The database may be a collection of data from uniform or non-uniform grids that contain network measurements with associated location estimates. Network measurement data may be then observed and measured typically by a mobile station or any other wireless device (operation 703). The network measurement data may include received base station power and timing advance, as well as other network characteristics observable by a mobile station. The observed network measurement data may then be modified (operation 705). This modification may include applying an attenuation function to some or all of the network measurement data or converting absolute values into relative values. The modification may be performed by a processor, microprocessor or ASICS. The modified network measurement data may then be compared to the calibration database in order to determine the location of the mobile station (operation 707). The comparison may be performed by a processor, microprocessor or ASICS.

FIG. 8 is another illustration of an embodiment of the present subject matter. A database of previously-gathered calibration data for a predetermined region in a wireless network may be provided (operation 801). Observed network measurement data may be collected which includes a first signal characteristic from the mobile's serving transmitter (operation 803). The observed network measurement data may be modified as a function of the first signal characteristic (operation 805), for example the first signal characteristic may be received power and the modification may be a function of the relative value with respect to the received power. The modified network measurement data may be compared with the database of calibration data to determine the location of the mobile station (operation 807).

FIG. 9 is an illustration of an embodiment of the present subject matter for determining a location of a mobile station. A database of calibration data for a region may be provided (901). Network measurement data from transmitters may be observed and collected including a signal characteristic from each of the transmitters (operation 903). An average value for the signal characteristic among the transmitters may be determined (operation 905). The average for the signal characteristic may be a weighted average. The observed network measurement data may be modified using the determined average value (operation 907) and the modified network measurement data may be compared with the database of calibration data to determine the location of the mobile station (operation 909).

FIG. 10 is an illustration of an embodiment of the present subject matter for determining a location of a mobile station. A database of previously-gathered outdoor calibration data for a predetermined region in a wireless network may be provided (operation 1001). Network measurement data may be observed and collected (operation 1003). The network measurement data may be compared with the database of calibration data to thereby determine a plurality of location estimates for the mobile station (operation 1005). The location estimates may be derived using modified, unmodified, limited signal characteristics, several signal characteristics, etc. For each location estimate, a confidence measure may be determined (operation 1007). A location may be determined based on the plurality of location estimates and their respective confidence measures (1009). For example, the location may be determined based on a weighted average, where the weights are directly proportional to the confidence measures.

The embodiments described above may be used in communication devices, such as, a base station, having varying configurations that include, but are not limited to: predetermined calibration data collected over varying terrain, different base station configurations, varying cellular communication protocols, etc.

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

What is claimed is:

1. A method for determining a location of a mobile station, comprising:
   providing a database of previously-gathered calibration data for a predetermined region in a wireless network;
   collecting observed network measurement data;
   modifying said observed network measurement data; and
   comparing said modified network measurement data with said database of calibration data by positioning determining equipment to thereby determine the location of the mobile station.

2. The method of claim 1 wherein said database comprises previously-gathered calibration data at one or more predetermined calibration points within said region.

3. The method of claim 2 wherein said previously-gathered calibration data at one or more predetermined calibration points is combined to form previously-gathered calibration data for one or more non-uniform grid points within said region.

4. The method of claim 1 wherein said database comprises previously-gathered calibration data for one or more non-uniform grid points within said region.

5. The method of claim 1 wherein said observed network measurement data includes data collected at the mobile station.

6. The method of claim 1 wherein said previously-gathered calibration data includes signal strength information measured at a predetermined calibration point within said region for a signal transmitted from a known location within or in proximity to said region.

7. The method of claim 1 wherein said previously-gathered calibration data includes signal strength information measured by a receiver at a known location within or in proximity to said region for a signal transmitted from a predetermined calibration point within said region.

8. The method of claim 1 wherein said previously-gathered calibration data includes round trip time information for signals traveling between a predetermined calibration point within said region and a known location within or in proximity to said region.

9. The method of claim 1 wherein said previously-gathered calibration data includes time difference of arrival information for a first signal traveling between a first known location and a predetermined calibration point within said region and a second signal traveling between a second known location and said calibration point.

10. The method of claim 1 wherein said previously-gathered calibration data includes information identifying a serving cell of a transmitter transmitting a signal received at a predetermined calibration point within said region.

11. The method of claim 1 wherein said previously-gathered calibration data includes information identifying a serving sector of a transmitter transmitting a signal received at a predetermined calibration point within said region.

12. The method of claim 1 wherein said previously-gathered calibration data includes information regarding a state of said wireless network.

13. The method of claim 1 wherein said previously-gathered calibration data includes calibration data gathered at a predetermined calibration point within said region wherein said predetermined calibration point is not located within a structure.

14. The method of claim 13 wherein said observed network measurement data is collected at a mobile station located within a structure.

15. A system for determining a location of a mobile station, comprising:
- a database of previously-gathered calibration data for a predetermined region in a wireless network;
- circuitry for collecting observed network measurement data;
- circuitry for modifying said observed network measurement data; and
- circuitry for comparing said modified network measurement data with said database of calibration data to thereby determine the location of the mobile station.

16. The system of claim 15 wherein said database comprises previously-gathered calibration data at one or more predetermined calibration points within said region.

17. The system of claim 16 further comprising circuitry for combining said previously-gathered calibration data at one or more predetermined calibration points to thereby form previously-gathered calibration data for one or more non-uniform grid points within said region.

18. The system of claim 15 wherein said database comprises previously-gathered calibration data for one or more non-uniform grid points within said region.

19. The system of claim 15 wherein said mobile station includes said circuitry for collecting observed network measurement data.

20. The system of claim 15 further comprising circuitry for measuring signal strength at a predetermined calibration point within said region for a signal transmitted from a known location within or in proximity to said region.

21. The system of claim 15 further comprising circuitry for measuring signal strength at a receiver at a known location within or in proximity to said region for a signal transmitted from a predetermined calibration point within said region.

22. The system of claim 15 further comprising circuitry for determining round trip time for signals traveling between a predetermined calibration point within said region and a known location within or in proximity to said region.

23. The system of claim 15 further comprising circuitry for determining time difference of arrival for a first signal traveling between a first known location and a predetermined calibration point within said region and a second signal traveling between a second known location and said calibration point.

24. The system of claim 15 further comprising circuitry for identifying a serving cell of a transmitter transmitting a signal received at a predetermined calibration point within said region.

25. The system of claim 15 further comprising circuitry for identifying a serving sector of a transmitter transmitting a signal received at a predetermined calibration point within said region.

26. The system of claim 15 wherein said previously-gathered calibration data includes information regarding a state of said wireless network.

27. The system of claim 15 wherein said previously-gathered calibration data includes calibration data gathered at a predetermined calibration point within said region wherein said predetermined calibration point is not located within a structure.

28. The system of claim 27 wherein said observed network measurement data is collected at a mobile station located within a structure.

29. A method for determining a location of a mobile station, comprising:
- providing a database of previously-gathered calibration data for a predetermined region in a wireless network, wherein said network includes a serving transmitter;
- collecting observed network measurement data including a first signal characteristic from said serving transmitter;
- modifying said observed network measurement data using said first signal characteristic; and
- comparing said modified network measurement data with said database of calibration data by positioning determining equipment to thereby determine the location of the mobile station.

30. The method of claim 29 wherein said database comprises previously-gathered calibration data for one or more non-uniform grid points within said region.

31. The method of claim 29 wherein said observed network measurement data includes data collected at the mobile station.

32. The method of claim 29 wherein said previously-gathered calibration data includes calibration data gathered at a predetermined calibration point within said region wherein said predetermined calibration point is not located within a structure.

33. The method of claim 32 wherein said observed network measurement data is collected at a mobile station located within a structure.

34. The method of claim 29 wherein said first signal characteristic is signal strength.

35. The method of claim 34 wherein said collecting observed network measurement data further includes collecting a second signal characteristic from a neighboring transmitter wherein said second signal characteristic is signal strength.

36. The method of claim 35 wherein the modifying of said calibration data uses a difference between said first and second signal characteristics.

37. The method of claim 29 wherein said first signal characteristic is signal strength of a control channel transmitted by said serving transmitter and received by said mobile station.

38. The method of claim 37 wherein said collecting observed network measurement data further includes collecting a second signal characteristic from a neighboring transmitter wherein said second signal characteristic is signal strength of a control channel transmitted by said neighboring transmitter and received by said mobile station.

39. The method of claim 29 wherein said observed network measurement data includes a data set comprising:

$[P_1, \ldots P_n, TA]$ where:
$P_1$ represents the signal strength of said serving transmitter as measured at said mobile station,
$P_n$ represents a signal strength of at a $n^{th}$ neighboring transmitter as measured at said mobile station, and
TA represents a timing advance parameter;
and wherein said modified network measurement data includes a data set comprising:

$[0, \ldots P_1-P_{n-1}, P_1-P_n, TA]$ where:
0 represents a difference between $P_1$ and $P_1$,
$P_1-P_{n-1}$ represents a difference between $P_1$ and $P_{n-1}$, and
$P_1-P_n$ represents a difference between $P_1$ and $P_n$.

40. The method of claim 39 wherein said first neighboring transmitter is not a member of said wireless network.

41. A method for determining a location of a mobile station, comprising:
- providing a database of previously-gathered calibration data for a predetermined region in a wireless network;
- collecting observed network measurement data from each of a plurality of transmitters including a signal characteristic from each one of said plural transmitters;
- determining an average value for select ones of said signal characteristics;
- modifying said observed network measurement data using said average value; and
- comparing said modified network measurement data with said database of calibration data by positioning determining equipment to thereby determine the location of the mobile station.

42. The method of claim 41 wherein said database comprises previously-gathered calibration data for one or more non-uniform grid points within said region.

43. The method of claim 41 wherein said observed network measurement data includes data collected at the mobile station.

44. The method of claim 41 wherein said previously-gathered calibration data includes calibration data gathered at a predetermined calibration point within said region wherein said predetermined calibration point is not located within a structure.

45. The method of claim 41 wherein said observed network measurement data is collected at a mobile station located within a structure.

46. The method of claim 41 wherein said signal characteristic is signal strength.

47. The method of claim 46 wherein the modifying of said calibration data uses a difference between said average value and said signal characteristic for a first one of said plural transmitters.

48. The method of claim 41 wherein said signal characteristic is signal strength of a control channel.

49. The method of claim 41, wherein the observed network measurement data includes received signal strength of said transmitters as said mobile station.

50. The method of claim 41 wherein said observed network measurement data includes a data set comprising:

$[P_1, P_2, P_3, TA]$ where:
- $P_1$ represents the signal strength of a first one of said plural transmitters as measured at said mobile station,
- $P_2$ represents a signal strength of a second one of said plural transmitters as measured at said mobile station wherein $P_2 > P_1$,
- $P_3$ represents a signal strength of a third one of said plural transmitters as measured at said mobile station wherein $P_2 > P_3$, and
- TA represents a timing advance parameter;

and wherein said modified network measurement data includes a data set comprising:

$[P_1 - P_{AVG}, P_2 - P_{AVG}, P_3 - P_{AVG}, TA]$ where:
- $P_{AVG}$ represents an average value of $P_1$, $P_2$, and $P_3$,
- $P_1 - P_{AVG}$ represents a difference between $P_1$ and $P_{AVG}$,
- $P_2 - P_{AVG}$ represents a difference between $P_2$ and $P_{AVG}$,
- $P_3 - P_{AVG}$ represents a difference between $P_3$ and $P_{AVG}$.

51. The method of claim 50 wherein said first transmitter is a serving transmitter for said mobile station and said second and third transmitters are neighboring transmitters.

52. The method of claim 41 wherein at least one of said plurality of transmitters is not a member of said wireless network.

* * * * *